Figures 1, 2, 3:
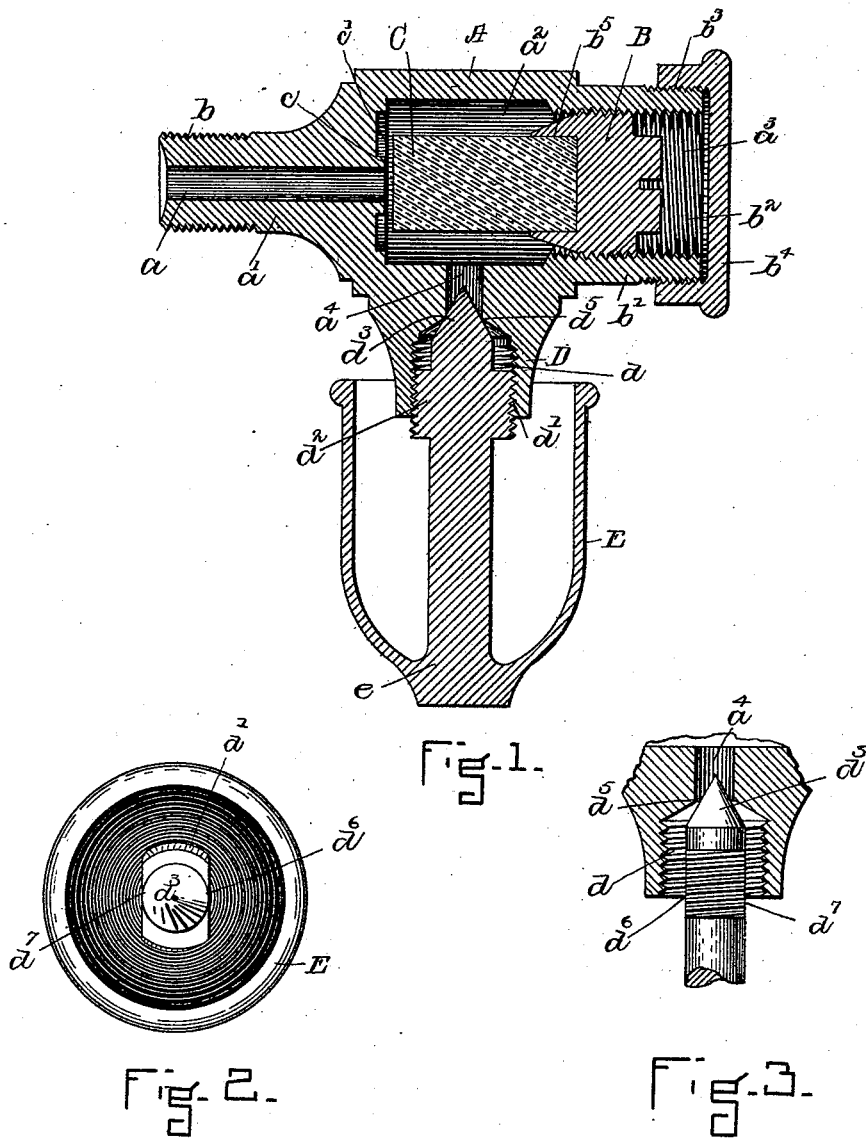

(No Model.)

C. JENKINS.
AUTOMATIC AIR VALVE.

No. 498,275. Patented May 30, 1893.

WITNESSES.
J. M. Dolan
J. T. Ball.

INVENTOR.
Charles Jenkins
by his atty.
Charles K. Raymond

UNITED STATES PATENT OFFICE.

CHARLES JENKINS, OF BOSTON, MASSACHUSETTS.

AUTOMATIC AIR-VALVE.

SPECIFICATION forming part of Letters Patent No. 498,275, dated May 30, 1893.

Application filed March 3, 1890. Serial No. 342,421. (No model.)

*To all whom it may concern:*

Be it known that I, CHARLES JENKINS, a citizen of the United States, residing at Boston, in the county of Suffolk and State of Massachusetts, have invented a new and useful Improvement in Automatic Air-Valves, of which the following is a full, clear, and exact description, reference being had to the accompanying drawings, forming a part of this specification, in explaining its nature.

The invention relates to an automatic air valve having in addition to the usual devices by which the valve is self-acting, an additional or auxiliary valve which is not self-acting, and which is used for the purpose of preventing or rendering inoperative the action of the automatic valve.

The invention also relates to the use in connection with the auxiliary valve of a drip cup.

The invention further relates to various details of organization and construction to which reference is hereinafter made. It is represented as applied to an air valve for steam radiators having the features of the valve described in my Letters Patent of the United States, No. 409,685, dated August 27, 1889.

Referring to the drawings,—Figure 1 is a view in vertical central section of a valve having the features of my invention. Fig. 2 is a view in plan of the drip cup and attached valve removed from the valve, and Fig. 3 is a detail view in vertical section to further illustrate the construction and operation of the auxiliary valve.

In the drawings, A is the valve body or casing. It has the inlet passage $a$ through the long neck $a'$, the valve chamber $a^2$, the plug opening $a^3$ to the valve chamber, and the outlet $a^4$ through which the steam and condensed water or drip escapes. The neck $a'$ has the exterior thread $b$ which screws into the pipe leading to the radiator. The plug opening $a^3$ is formed in an extension $b'$ of the valve body, and there is formed in this extension the interior screw thread $b^2$ in which the screw plug or valve holder B screws, and an exterior screw thread $b^3$ upon which a cap $b^4$ screws. The plug or valve holder B has at its inner end a somewhat deep cavity $b^5$ of a size to firmly receive and hold an expansion valve C, which is like that described in my said patent. The valve is driven tightly into the hole $b^5$ to be securely fastened to the block or valve holder B, and it is surrounded by the valve chamber $a^2$. At the inner end of the valve chamber is the raised seat $c$ which surrounds the inlet passage $a$ where it enters the valve chamber, and against which the end $c'$ of the packing is brought into contact to close the passage through the valve chamber automatically as the valve is heated by the hot air and steam which passes into and through the chamber $a^2$ until the valve is expanded sufficiently to shut upon the raised valve seat.

To insure a passage of hot air and steam from the radiator or other device controlled by the automatic air valve, it is necessary that there should be a circulation or passage from the radiator or other device controlled by the air valve through the valve to the outer air which should be open when it is desired that the radiator or other device should be controlled entirely by the automatic valve, in order that the expansible valve may be quickly subjected to a variation in temperature. If there were no circulation through the valve from the radiator or other device, the heated air and steam would not find their way from the radiator through the passage $a$ to the valve chamber at least readily, and the valve would not be automatically actuated, that is, the heat would be so slow in reaching the chamber $a^2$ that it would be a long time before the expansible valve would operate at all. On the other hand, where a circulation or escape is provided for the air and steam, the radiator or other device quickly fills with steam and hot water, the hot air and steam pass through the valve chamber and quickly causes the expansible valve to act, but to enable this to be done, it is practically necessary to fill the entire radiator with steam or hot water or hot air of practically the full temperature of the heating medium in the conducting pipes and generator. It is often desirable, however, not to let in to the radiator its full capacity of the heating medium. This, however, cannot be effected by an automatic air valve alone. By the addition of an auxiliary valve it can be, and it is accomplished by closing the circulating passage so that the heating medium passes into the radiator, to some extent backs against the cold air in the radiator which, not escaping through the ordinary escape pipe and through the air valve chamber, prevents the radiator from filling with the heating medium of high temperature, but permits only a limited amount to enter, and then warms or heats but gradually, so that the radiator does not give off the heat which it otherwise would if filled with the heating medium of high temperature. To accomplish this purpose, I have placed a throttle or valve in the escape or drip passage $a^4$ of the air valve, and in Fig. 1 have represented the drip passage of the air valve as formed in a downwardly extending neck D. This neck has a chamber $d$ into which the escape passage $a^4$ extends, and which is larger in size than the escape passage; it is provided with an interior screw thread $d'$, and into this chamber $d$ there screws a threaded spindle $d^2$, which has its inner end $d^3$ made conical to form the valve. This conical extension of the threaded spindle enters the escape passage $a^4$, and by screwing the spindle one way or the other the conical end is caused to be seated against the seat $d^5$ at the point where the outlet enters the chamber $d$, or is moved therefrom sufficiently to form a passage about it, as may be desired. The spindle has the sides $d^6$ $d^7$ of the threaded section cut away to form passages between it and the inner side of the neck D, so that the drip when the valve $d^3$ is opened to permit its escape from the valve chamber may fall into the drip cup E.

The spindle $d^2$ is represented as made integral with the drip cup E, and as extending from its bottom $e$ centrally through the chamber to above its top (see Fig. 1), and the threaded section of the spindle not only serves in connection with the threaded section f the neck D to operate the valve $d^3$, but to also hold the drip cup in place, and the drip cup itself serves as a handle or knob by which the valve $d^3$ is turned.

It will be observed that in order to regulate the radiator by the automatic air valve only, the auxiliary valve $d^3$ is turned sufficiently to open the drip passage $a^4$, and that then the regulation of the radiator by the valve C is automatic continuously, that is, when the steam or heating medium is let on to the radiator, the cold air escapes until the heating medium enters the valve chamber and causes the expansion of the valve C sufficiently to cause its end surface $c'$ to close upon the valve seat and shut off the connection between the inlet $a$ and the valve chamber, that upon the cooling of the heating medium sufficiently the valve C contracts and opens the passage $a$ to again restore the circulation which brings the heating medium again into the chamber to cause the valve to operate to again close the inlet.

To prevent the action of the automatic valve C, the auxiliary valve $d^3$ is operated to close the drip outlet $a^4$. This destroys the circulation through the passage $a$ and valve chamber and consequently there is no escape provided for the cool air from the radiator, and the automatic valve becomes inoperative, but at the same time the heating capacity of the radiator is much lessened.

It will be noticed that by forming and arranging the inlet and outlet of the valve as described, and holding the expansible composition packing by the plug as indicated, that when the valve is open, the medium which operates it passes through the inlet and valve chamber to the drip or outlet, but that when it is closed all access to the valve chamber through the inlet $a$ is cut off, and consequently none of the steam or other medium is in the valve chamber, and there can be no escape of the steam through the chamber as would be the case if the points of inlet and outlet were reversed, that is, if $a^4$ were the inlet, and $a$ the outlet of the valve.

It will be noticed that in the valve structure illustrated herein the valve proper C which is in reality both the valve proper and the differential expansion rod of this apparatus is arranged to open with and close against the direction of the escape current from the radiator. When the radiator is cooled off, the composition of which the valve is made contracts much more rapidly than the metal of the valve body contracts, and so opens the escape passage.

When steam is admitted to the radiator, the air is first blown out through the open valve, and steam then entering the valve body warms it and the contained valve C within it sufficiently to expand them both according to their natures, and the co-efficient of expansion of valve C for a given temperature being greater than that of the metal valve body A the valve C elongates more than the metal of the valve body A, and this movement of the valve causes its extremity to cross the interval between the face $C'$ of the valve proper C, and the metal seat $c$ around the inlet passage $a$, and hence, the valve comes in contact with the metal seat $c$ around the inlet passage $a$, and closes it.

The temperature of the parts required to keep everything tight is as a fact maintained until the radiator is cooled off, if the valve is properly adjusted. This is probably due in part to conduction of heat through the metal walls of the valve body, but I do not pretend to wholly explain the cause of the tightness of this valve under these circumstances. I simply assert it to be a fact the philosophy of which I do not wish to be responsible for.

It is a matter of experience that a valve shutting against the exit current from a radiator can be more readily adjusted by a user who is not an expert without injury, than one closing with the exit current. An expert would adjust the one nearly, if not quite as readily as the other. Whoever removed the cap $b^4$ would find that steam would issue through the threads of the valve holder B. An expert would adjust the valve holder carefully just feeling the seat with the valve C when all the parts were hot, even if the steam did issue from around the threads of the valve holder B, which it always would if the valve controlled the exit passage rather than the inlet passage. A person who was not an expert in adjusting such a valve, which controlled the exit passage, not infrequently was disturbed by the issuance of steam around the threads of the valve holder B, and, thinking that the valve was leaking, screwed it down upon the seat so hard as at times to crush or deform the packing of which the valve was made. For the benefit therefore, of persons who are not experts in adjusting radiator air valves, it was considered desirable that the issuance of steam from around the threads of the valve holder B should be an indication that the valve needed to be screwed down a little more, while the cessation of this issuance indicated that it was down far enough. This, it will be seen, gave a larger clientage and popularity to such a valve than the other form of construction and is commercially preferable. The fact however, could not well have been ascertained without experimenting with both kinds of valves in the hands of people who were not steam-fitters or adjusters of steam-heating apparatus. Of course, also it is an advantage not to have pressure on the inside of the cap except when the valve is open but this is of less advantage than the increase of durability of the device and the lessening of the danger of careless hands putting the mechanism out of order, which danger is practically eliminated in the valve which shuts against the issuance of steam from the inlet passage to the valve body, and which exists always in the valve which shuts with the issuing steam and closes the exit passage from the valve body. I consider it therefore of importance that the valve should close the inlet rather than the exit passage of the valve body.

Having thus fully described my invention, I claim and desire to secure by Letters Patent of the United States—

1. The combination of an automatic air valve having a passage connecting its valve chamber with the radiator or other device with which it operates, and an automatic valve proper closing toward the inlet passage of the valve body, which valve proper is operated by variations in the temperature of the medium which circulates through the valve chamber of said automatic air valve, and an outlet from said valve chamber with an additional valve for opening or closing said outlet substantially as and for the purpose described.
2. The combination of an automatic air valve having an escape or drip passage $a^4$, with an auxiliary valve to control or close said passage, as and for the purposes described.

3. An air valve containing a valve C of high expansibility under heat, placed in a passage to which a fluid of varying temperature has access through the valve seat when the valve is open, and from which passage said fluid is shut off when the valve is closed, in combination with an escape passage from the valve chamber and an auxiliary or supplemental valve adapted to open and close said escape passage, substantially as and for the purpose described.

4. An air valve for radiators consisting of a suitable body and neck for attachment to a radiator, which body and neck contain a valve chamber, induction and eduction passages and a valve seat within the chamber surrounding the induction passage, and another valve seat in the eduction passage, in combination with a valve of much higher expansibility, under the influence of heat, than the walls of the chamber, which valve is located within the walls of the valve chamber and opposite to the valve seat, and is held at the end farthest from the valve seat in predetermined fixed relations with the walls of said valve chamber and with an auxiliary or supplemental valve adapted to the eduction passage, whereby the eduction passage may be closed, and the hot steam of the radiator kept away from the thermotically expansible valve by trapping air within the radiator, substantially as described.

5. The combination in an air valve of the neck D having the escape or drip passage $a^4$ with the drip-cup E, the valve spindle connected therewith and an interrupted screw to screw into the neck, and having at its upper end a valve to close the drip passage $a^4$, as and for the purpose described.

6. The combination in an automatic valve of the valve body A, the neck $a'$, the inlet $a$, the drip passage $a^4$ from the valve chamber $a^2$, the plug or valve holder B having the recess $b^5$, the valve of compressible composition packing C, fastened securely to the plug B, and adjustable therewith to and from the valve seat $c$ which surrounds the inlet passage, all arranged and operating to exclude automatically by the expansion of the valve C under heat steam or air from the outlet $a^4$ and by the contraction of said valve C to admit steam and air to said valve chamber, substantially as and for the purpose described.

CHARLES JENKINS.

In presence of—
F. F. RAYMOND, 2d,
J. M. DOLAN.